United States Patent Office 2,909,540
Patented Oct. 20, 1959

2,909,540

MONOGLYCERIDE PREPARATION

George E. Woods, Wilmington, Del., assignor to Atlas Powder Company, Wilmington, Del., a corporation of Delaware No Drawing. Application March 8, 1956
Serial No. 570,219

8 Claims. (Cl. 260—410.7)

The present invention relates to the manufacture of monoglycerides and particularly monoglycerides of fatty acids. Products containing high proportions of monoglycerides have recently become increasingly technically important in the emulsifier field.

Customarily fatty acid monoglycerides are prepared by reacting glycerin with fat or fatty acid or both. The reaction is an equilibrium one and an excess of glycerin is usually employed so that the equilibrium will be driven toward monoglycerides in preference to the higher glycerides. Both monoglyceride content and speed of reaction are also increased as the reaction temperature is increased, and temperatures of at least about 225° C. are generally preferred in the production of fatty acid monoglyceride preparations of high monoglyceride content. Although, when the reaction is completed at temperatures above about 225° C., the monoglyceride content is relatively high, that condition does not continue if the reaction mass is permitted to cool slowly. During cooling excess glycerin separates out of the reaction mixture leaving insufficient dissolved glycerin to maintain the equilibrium. The reaction then reverses and as the mass cools the monoglycerides revert to a considerable extent to higher glycerides and free glycerin. Because the extent of the reversion is a function of time, the more rapidly the mixture can be cooled the higher the final content of monoglyceride will be.

Reversion is particularly rapid at temperatures higher than about 205° C. At lower temperatures reversion also takes place but it is often not so rapid that some processing operations cannot be conducted without serious loss of monoglyceride content. At room temperatures reversion is negligible.

Because reversion is so rapid at temperatures above about 205° C. it is important in the manufacture of products of high monoglyceride content that a reaction mixture produced at a higher temperature be quickly cooled to about 205° C. or below.

According to the present invention, cooling of the reaction mass is accomplished rapidly by distilling glycerin from it so that the heat of vaporization of glycerin is abstracted. The distillation is brought about by maintaining adequately reduced pressures. Because an undue excess of glycerin in the reaction may promote the development of undesired side reactions, there will ordinarily not be enough glycerin included in the reaction mixture so that distillation of the free glycerin will provide sufficient heat loss to produce the necessary temperature lowering. A particular feature of the present invention is the addition of glycerin to the reaction mixture when it is desired to conduct the cooling operation, and the distillation from the mixture of both the added glycerin and glycerin originally present. In this way sufficient heat of vaporization is abstracted from the reaction mixture to produce the necessary amount of cooling. Desirably, the added glycerin is introduced to the reacted mixture simultaneously with the distillation of glycerin so as on the one hand, to maintain a sufficient excess of glycerin to force the equilibrium as far as possible toward monoglyceride formation and, on the other hand, to avoid holding added glycerin an unduly long time at temperatures conducive to side reactions. Most desirably the simultaneous addition and distillation of glycerin is accomplished by refluxing distilled glycerin back into the reacted mixture.

After the reacted mixture has cooled sufficiently that distillation of the free glycerin present will reduce the temperatures to a value where reversion problems are not as significant, additional glycerin addition may be stopped and the glycerin present distilled off. Usually the addition of glycerin may be conveniently stopped within the range of from about 215° C. to about 235° C.

It is usually difficult to distill off residual amounts of glycerin at temperatures below about 190° C. On the other hand, distillation can ordinarily be conducted at temperatures as high as about 205° C. without reversion being sufficiently rapid to cause serious difficulty. Hence, in order to complete the removal of glycerin to the extend desired it is often preferred, after the mixture has been cooled to a value within the range of from about 190° C. to about 205° C., to heat the mixture so as to maintain its temperature within that range. After distillation of glycerin is completed, final cooling of the reaction mixture may be accomplished by any rapid conventional method.

It is necessary to heat the reaction mixture prior to the time equilibrium is reached in order to maintain reaction temperatures above about 225° C. Ordinarily temperatures above about 275° C. are not used, but the cooling process of the present invention can be applied to monoglycerides prepared at higher temperatures, such as, for example, 290° C. It is usually preferred to heat sufficiently to conduct the reaction at temperatures between about 240° C. and about 260° C. Until equilibrium is reached, sufficient pressure should usually be imposed upon the reaction zone to prevent the glycerin from boiling. On the other hand, subatmospheric pressures above the pressure at which glycerin boils from the mixture are desirable to promote removal of volatile impurities and odor bodies. During the cooling steps it is, of course, desirable to cease addition of heat to the reaction mixture, and the glycerin is caused to boil by lowering the pressure on the reaction mass to values low enough to permit rapid distillation of glycerin. Of course, the lower the pressure can be maintained the more rapid distillation will be and the less reversion will be encountered. Auxiliary cooling techniques may, of course, also be employed.

As is well understood in the art, the reaction of glycerin with fats and fatty acids is preferably catalyzed. Basic alkali or alkaline earth compounds are the catalysts most commonly used. For example, oxides and hydroxides of calcium, barium, strontium, sodium, lithium or potassium are suitable in amounts ranging generally between 0.01 and 0.5% by weight of the reaction mixture. Soaps of these metals are equally useful as catalysts and probably are formed in the reaction when the bases are used. Acidic catalysts such as para toluene sulfonic acid or phosphoric acid are also sometimes suitable.

Reversion of the monoglyceride produced to higher glycerides also can be, and preferably is, hindered by destroying the catalyst prior to the cooling step. Basic catalysts may be destroyed by neutralization with a mineral acid, for example phosphoric acid or sulphuric acid. Acidic catalysts may be destroyed by neutralization with a base such as calcium or sodium hydroxide.

It has been stated that it is desirable to employ in the reaction an excess of glycerin sufficient to drive the equilibrium toward monoglyceride production but insufficient to promote side reactions. In general it is preferred to use the maximum amount of glycerin which will dissolve in the reaction mixture at reaction temperatures. A molar ratio of total free and combined glycerin to total free and combined fatty acid between the values of about 1.3 and about 3.0 is usually preferred for this purpose.

The process of the present invention may be employed in the manufacture of any monoglyceride. However, its most general use is in connection with the manufacture of monoglycerides of the fatty acids and particularly fat forming fatty acids; that is to say, those acids having straight chains of between about 10 and about 24 carbon atoms.

The invention will be further illustrated by the following examples of specific embodiments:

*Example I*

2,000 parts by weight of fully hydrogenated edible tallow and 895 parts by weight of glycerin containing 1.7% water were charged into a reactor fitted with a condenser, the temperature of which was regulated by a flow of water. The pressure on the condenser and the reactor was controlled by an ejector. While the charge was vigorously agitated heat was applied to the reactor to bring the charge to reaction temperature. While this heating operation was being performed, about 4½ parts by weight of calcium hydroxide catalyst were added in the form of an aqueous slurry. The pressure on the condenser and the reactor was maintained sufficient to keep the glycerin from distilling in any appreciable amounts but other more volatile impurities were permitted to escape. When the reaction temperature, which in this case was 245° C., was reached an absolute pressure of 450 mm. of mercury was employed. It required about one hour to heat the mixture from 200° C. to 245° C. The reaction mass was held at 245° C. for 15 minutes to complete the reaction. The heat supply to the reactor was then shut off; the pressure on the reactor and the condenser was decreased to 400 mm. of mercury; and the catalyst was neutralized by the addition of about 6.4 parts by weight of 85% ortho phosphoric acid. The condenser valves were adjusted to permit refluxing of distilled glycerin, and the condenser water temperature was lowered to insure condensation of distilled glycerin. At the same time the pressure was lowered as rapidly as equipment would permit. In the course of 13 minutes under these conditions of reflux the temperature of the charge had dropped to 220° C. at which time the reactor pressure was 70 mm. of mercury. At this point the condenser valves were set to stop the refluxing of glycerin and start the glycerin running from the condenser into a separate receiving vessel so that the reaction mass would be deglycerinated. The deglycerination operation was conducted by continuing to reduce pressure on the reaction vessel as fast as possible while maintaining the condenser water inlet temperature adequate to condense the glycerin. After about 35 minutes of deglycerination the temperature of the reaction mass had dropped to 194° C. and the pressure on the reactor was 12 mm. of mercury. Heat was then added to the product sufficient to keep the temperature between 196° C. and 199° C. for 9 additional minutes after which the pressure on the reactor had reached 10 mm. of mercury and the deglycerination was considered complete. The deglycerinated product was then circulated through a cooler in which it was cooled from 196° C. to 135° C. in 18 minutes. The mixture was then run into a receiving vessel where it was further cooled to about 70° C. after which it was spray-cooled and packaged. It will be seen that by the use of reflux, very rapid cooling was obtained between the time the reaction was completed and temperatures below about 205° C. were reached.

The final reaction product contained a total monoglyceride content of 66% and a free glycerin content of less than 1%.

The process of this example has been similarly used to process tallow, lard, vegetable oils and similar fats and oils both hydrogenated and non-hydrogenated.

*Example II*

The following example shows the use of somewhat higher reaction temperature.

185 parts by weight of prime steam lard, 100 parts by weight of glycerin containing 2% of water, and about 0.4 part of calcium hydroxide were charged into a closed reaction vessel fitted with an agitator. The reaction vessel was evacuated to an absolute pressure of 125 mm. of mercury, and the reactor was heated. When the temperature had reached 180° C. the pressure on the closed vessel was adjusted to 500 mm. of mercury. Heating was then continued to 255° C. and this temperature was maintained for 15 minutes. Heating from 180° C. to 255° C. required 30 minutes. After the reaction period the vacuum on the vessel was released with an inert gas and the heat to the reaction was shut off. The reaction vessel was fitted with a reflux condenser and about ½ part of 85% ortho phosphoric acid was added after which refluxing was started by reducing the pressure on the reaction mass. Under these refluxing conditions the reaction mass cooled from 255° C. to 227° C. in five minutes. The condenser was then set up to remove glycerin instead of to reflux. After 30 minutes of deglycerination the temperature of the reaction mass was 203° C. and the absolute pressure had been reduced to 9 mm. of mercury. A product having about 69% of total monoglyceride content and a free glycerin content of about 1½% was obtained.

EXAMPLE III

This example shows the use of fatty acid as a charging stock.

About 123 parts by weight of glycerine and 180 parts by weight of red oil (commercial oleic acid) were charged into a reaction vessel which was equipped in a similar manner to the vessel described in Example I. Heat was applied to the reaction mass and ½ part by weight of calcium hydroxide slurried in water was added. After the charge temperature had reached 210° C. this temperature was maintained for an hour to react most of the free fatty acid with glycerin. The temperature was then increased to 240° C. which took 20 minutes, during which time the pressure was maintained sufficient to prevent substantial distillation of the glycerin, as in Example I. The reaction was continued for 20 minutes at 240° C. after which time the catalyst was neutralized with 0.7 of a part of 85% ortho phosphoric acid. The reaction temperature used in accordance with this example was lowered from that used in Example I in order to minimize some glycerin boil-up and glycerin loss which might otherwise have occurred. During the time that the reaction is held at 210° C. considerable water is evolved from the reaction between fatty acid and glycerin. After the addition of phosphoric acid the temperature was decreased to 230° C. during a 7 minute period by refluxing glycerin. After the temperature had reached 230° C. deglycerination was commenced and was completed in 36 minutes at which time the temperature of the mass was 193° C. and the absolute pressure was 9 mm. of mercury. The product was then further cooled through a cooler, filtered and packaged. The final product had a total monoester content of about 61% and a free glycerin content of about 1%.

What is claimed is:

1. In a process for manufacturing a monoglyceride during which a reacted mixture containing principally glycerin and monoglyceride is produced at an elevated temperature, the process of cooling said reacted mixture which comprises adding glycerine to said mixture and distilling glycerin therefrom without adding heat thereto, whereby cooling is accomplished by the removal of heat of evaporation from said mixture.

2. In a process for manufacturing a monoglyceride during which a reacted mixture containing principally glycerin and monoglyceride is produced at a temperature between about 225° C. and 275° C. under a pressure sufficient to maintain glycerin in the reaction mixture, the process of cooling said mixture and removing glycerin therefrom which comprises lowering the pressure sufficiently to permit glycerin to distill, refluxing distilled glycerin back into the reaction mixture without adding heat thereto until the temperature is sufficiently lowered that distillation of glycerin away from the reaction mixture will further lower the temperature to a value of not more than about 205° C. and then distilling glycerin away from said mixture until a temperature between about 190° C. and 205° C. is reached.

3. A process in accordance with claim 1 in which the addition of glycerin to said mixture and the distillation of said glycerin is simultaneous.

4. A process according to claim 1 in which the addition of glycerin to the reaction mixture is accomplished by distillation of said mixture under reflux.

5. A process according to claim 4 in which the mixture is cooled from a temperature not less than about 225° C.

6. A process for the preparation of a monoglyceride of a fat forming fatty acid which comprises reacting glycerin with a substance selected from the group consisting of fat forming fatty acids and glycerin esters thereof at a temperature between about 225° C. and about 275° C. and at a pressure sufficient to maintain glycerin in said reaction mixture, the amount of glycerin in both free and combined form present in the reaction mixture being sufficient to provide no more than about 3 mols per mol of total free and combined fatty acid, cooling the reaction mixture by lowering the pressure on said reaction mass so that glycerin distills therefrom, and simultaneously adding glycerin to said mixture, stopping the addition of glycerin when said reaction mixture has reached a temperature sufficiently low that distillation of the glycerin present will bring the temperature of the reaction mixture down to a temperature no greater than about 205° C., continuing distillation of glycerin until a temperature between about 190° C. and about 205° C. is reached, and then maintaining a temperature within that range until glycerin is substantially removed from the reaction mixture.

7. A process according to claim 6 where the addition of glycerin is accomplished by reflux.

8. A process for preparing a monoglyceride of a fat forming fatty acid which comprises reacting a mixture of glycerin and a material selected from a group consisting of fat forming fatty acids and glycerin esters thereof, the glycerin being present in free and combined form in an amount between about 1.3 and about 3.0 mols per mol of total free and combined fatty acid, at a temperature between about 240° C. and about 260° C. and under a pressure sufficient to maintain glycerin in said reaction, lowering the pressure sufficiently to permit distillation of glycerin, refluxing distilled glycerin into the reaction mixture until the temperature is lowered to a value between about 215° C. and about 235° C., then removing glycerin from the reaction zone by distillation until a temperature of between about 190° C. and about 205° C. is reached, and then maintaining the temperature within that range until glycerin is substantially removed from the reaction mixture.

References Cited in the file of this patent

UNITED STATES PATENTS

| | | |
|---|---|---|
| 2,206,168 | Edeler et al. | July 2, 1940 |
| 2,383,581 | Arrowsmith et al. | Aug. 28, 1945 |
| 2,496,328 | Bell et al. | Feb. 7, 1950 |
| 2,634,234 | Kuhrt | Apr. 7, 1953 |

FOREIGN PATENTS

| | | |
|---|---|---|
| 689,275 | France | Sept. 4, 1930 |
| 1,022,402 | France | Mar. 4, 1953 |
| 712,747 | Great Britain | July 28, 1954 |

OTHER REFERENCES

Schwitzer—Continuous Processing of Fats, 1952, page 159.